US 9,677,412 B2

United States Patent
Jones et al.

(10) Patent No.: US 9,677,412 B2
(45) Date of Patent: Jun. 13, 2017

(54) SHROUD ARRANGEMENT FOR A GAS TURBINE ENGINE

(71) Applicant: ROLLS-ROYCE PLC, London (GB)

(72) Inventors: Simon Lloyd Jones, Bristol (GB); Mark John Simms, Bristol (GB)

(73) Assignee: ROLLS-ROYCE plc, London (GB)

(*) Notice: Subject to any disclaimer, the term of this patent is extended or adjusted under 35 U.S.C. 154(b) by 440 days.

(21) Appl. No.: 14/275,452

(22) Filed: May 12, 2014

(65) Prior Publication Data
US 2014/0341707 A1 Nov. 20, 2014

(30) Foreign Application Priority Data

May 14, 2013 (GB) .................................. 1308602.0

(51) Int. Cl.
| | | |
|---|---|---|
| *F04D 27/02* | (2006.01) | |
| *F01D 11/24* | (2006.01) | |
| *F01D 25/24* | (2006.01) | |
| *F01D 9/04* | (2006.01) | |

(52) U.S. Cl.
CPC .............. *F01D 11/24* (2013.01); *F01D 9/04* (2013.01); *F01D 25/246* (2013.01); *F05D 2240/11* (2013.01); *F05D 2260/20* (2013.01); *F05D 2260/204* (2013.01); *Y02T 50/676* (2013.01)

(58) Field of Classification Search
CPC ............. F05D 2240/11; F05D 2260/20; F05D 2260/204
See application file for complete search history.

(56) References Cited

U.S. PATENT DOCUMENTS

| | | | | |
|---|---|---|---|---|
| 4,949,545 | A | * | 8/1990 | Shekleton ............... F23R 3/002 60/756 |
| 5,993,150 | A | | 11/1999 | Liotta et al. |
| 6,340,285 | B1 | * | 1/2002 | Gonyou ................ F01D 11/005 415/116 |

(Continued)

FOREIGN PATENT DOCUMENTS

| | | |
|---|---|---|
| EP | 0690205 A2 | 1/1996 |
| EP | 1162346 A2 | 12/2001 |
| EP | 2 570 613 A2 | 3/2013 |

OTHER PUBLICATIONS

British Search Report issued in British Application No. GB1308602.0 issued Nov. 22, 2013.

(Continued)

*Primary Examiner* — Jesse Bogue
(74) *Attorney, Agent, or Firm* — Oliff PLC

(57) ABSTRACT

A seal segment of a shroud arrangement for bounding a hot gas flow path within a gas turbine engine, including: a plate having an inboard hot gas flow path facing side and an outboard side; a bulkhead extending from the outboard side of the plate which defines a fore portion and an aft portion; a first cooling circuit within the plate for cooling a first portion of the plate; a second cooling circuit within the plate for cooling a second portion of the plate; wherein the first cooling circuit is in fluid communication with the fore portion and the second cooling circuit is in fluid communication with the aft portion and the first and second cooling circuits are fluidically isolated from one another. Also described is a method of cooling a seal segment in a gas turbine engine.

14 Claims, 5 Drawing Sheets

(56) References Cited

U.S. PATENT DOCUMENTS

| | | | | |
|---|---|---|---|---|
| 6,354,795 B1* | 3/2002 | White | ............... | F01D 11/24 |
| | | | | 415/116 |
| 8,147,192 B2* | 4/2012 | Jones | ............... | F01D 11/24 |
| | | | | 415/173.1 |
| 8,556,575 B2* | 10/2013 | Knapp | ............... | F01D 5/20 |
| | | | | 415/115 |
| 8,814,507 B1* | 8/2014 | Campbell | ............ | F01D 5/08 |
| | | | | 415/139 |
| 2004/0146399 A1 | 7/2004 | Bolms et al. | | |
| 2007/0041827 A1* | 2/2007 | Camus | ............... | F01D 9/04 |
| | | | | 415/116 |
| 2007/0248462 A1* | 10/2007 | Lutjen | ............... | F01D 9/06 |
| | | | | 416/95 |
| 2008/0131260 A1 | 6/2008 | Lee et al. | | |
| 2011/0171013 A1 | 7/2011 | Arzel et al. | | |
| 2014/0047843 A1* | 2/2014 | Papple | ............ | F01D 5/187 |
| | | | | 60/726 |

OTHER PUBLICATIONS

Jan. 20, 2015 Search Report issued in European Application No. 14167855.

* cited by examiner

SHROUD ARRANGEMENT FOR A GAS TURBINE ENGINE

TECHNICAL FIELD OF INVENTION

This invention relates to shroud arrangement for a gas turbine engine. In particular, the invention relates to a shroud arrangement which is cooled using two sources of cooling air.

BACKGROUND OF INVENTION

FIG. 1 shows a ducted fan gas turbine engine 10 comprising, in axial flow series: an air intake 12, a propulsive fan 14 having a plurality of fan blades 16, an intermediate pressure compressor 18, a high-pressure compressor 20, a combustor 22, a high-pressure turbine 24, an intermediate pressure turbine 26, a low-pressure turbine 28 and a core exhaust nozzle 30. The fan, compressors and turbine are all rotatable about a principal axis 31 of the engine 10. A nacelle 32 generally surrounds the engine 10 and defines the intake 12, a bypass duct 34 and a bypass exhaust nozzle 36.

Air entering the intake 12 is accelerated by the fan 14 to produce a bypass flow and a core flow. The bypass flow travels down the bypass duct 34 and exits the bypass exhaust nozzle 36 to provide the majority of the propulsive thrust produced by the engine 10. The core flow enters in axial flow series the intermediate pressure compressor 18, high pressure compressor 20 and the combustor 22, where fuel is added to the compressed air and the mixture burnt. The hot combustion products expand through and drive the high, intermediate and low-pressure turbines 24, 26, 28 before being exhausted through the nozzle 30 to provide additional propulsive thrust. The high, intermediate and low-pressure turbines 24, 26, 28 respectively drive the high and intermediate pressure compressors 20, 18 and the fan 14 by interconnecting shafts 38, 40, 42.

The performance of gas turbine engines, whether measured in terms of efficiency or specific output, is generally improved by increasing the turbine gas temperature. It is therefore desirable to operate the turbines at the highest possible temperatures. As a result, the turbines in state of the art engines, particularly high pressure turbines, operate at temperatures which are greater than the melting point of the material of the blades and vanes making some form cooling necessary. However, increasing cooling of components generally represents a reduction in efficiency and so much effort is spent in finding a satisfactory trade-off between turbine entry temperature, the life of a cooled turbine component and specific fuel consumption. This has led to a great deal of research and development of new materials and designs which can allow an efficient increase of the gas turbine entry temperature.

The present invention seeks to provide improved cooling arrangements for a gas turbine.

STATEMENTS OF INVENTION

In a first aspect, the present invention provides a seal segment of a shroud arrangement for bounding a hot gas flow path within a gas turbine engine, comprising: a plate having an inboard hot gas flow path facing side and an outboard side; a bulkhead extending from the outboard side of the plate which defines a fore portion and an aft portion; a first cooling circuit within the plate for cooling a first portion of the plate; a second cooling circuit within the plate for cooling a second portion of the plate; and, one or more chimneys which define one or more inlet passages for one of the first or second cooling circuits, wherein the first cooling circuit is in fluid communication with the fore portion and the second cooling circuit is in fluid communication with the aft portion and the first and second cooling circuits are fluidically isolated from one another, characterised in that: the chimneys extend across an isolation chamber which is in fluid communication with the main gas flow path.

Providing a fore and aft portion in this way allows a dual source air supply to be used. The dual source air supply can be beneficial as the temperature and pressure of the cooling air can be tailored to suit a particular location of the seal segment thereby helping to reduce over pressurisation or over cooling of the cooling air. The use of a bulkhead is particularly advantageous as it allows the cooling air to be provided from a downstream source which may be required for lower pressure applications downstream, such as for cooling an NGV downstream of the seal segment.

The seal segment may further comprise a fore attachment and an aft attachment for supportably attaching the seal segment to a carrier or engine casing. The bulkhead may be part of either the fore or aft attachment.

The bulkhead may include axially offset portions of circumferentially extending wall. At least one of the circumferentially extending walls may be provided by a chimney.

Each cooling circuit may include two or more sub-circuits.

The second cooling circuit may terminate in one or more outlets local to a downstream edge of the plate.

The seal segment may be configured to provide one circumferentially extending segment of a segmented annular shroud, and the first cooling circuit may terminate in one or more outlets local to a circumferential edge of the shroud.

The seal segment may include one part of a two part seal. The two part seal may separate the aft portion from the main gas flow path when in an assembled gas turbine engine. The seal may be is a flap seal.

A gas turbine engine may include a shroud arrangement, comprising: an engine casing; and the seal segment according to any preceding aspect.

The fore portion may be in fluid communication with a first air source having a first pressure and temperature. The aft portion may be attached to a second air source having a second pressure and temperature.

The aft portion may be connected to a chamber which provides air to a downstream nozzle guide vane.

There may also be provided a method of cooling a seal segment in a gas turbine engine, comprising: providing air at a first temperature and pressure to a fore portion of a seal segment; and, providing air at a second temperature and pressure to an aft portion of the seal segment, wherein the air provided at the second temperature and pressure is delivered to the seal segment from a downstream direction relative to the main gas flow path of the gas turbine engine.

DESCRIPTION OF DRAWINGS

Embodiments of the invention will now be described with the aid of the following drawings of which.

DETAILED DESCRIPTION OF INVENTION

Figure 1:
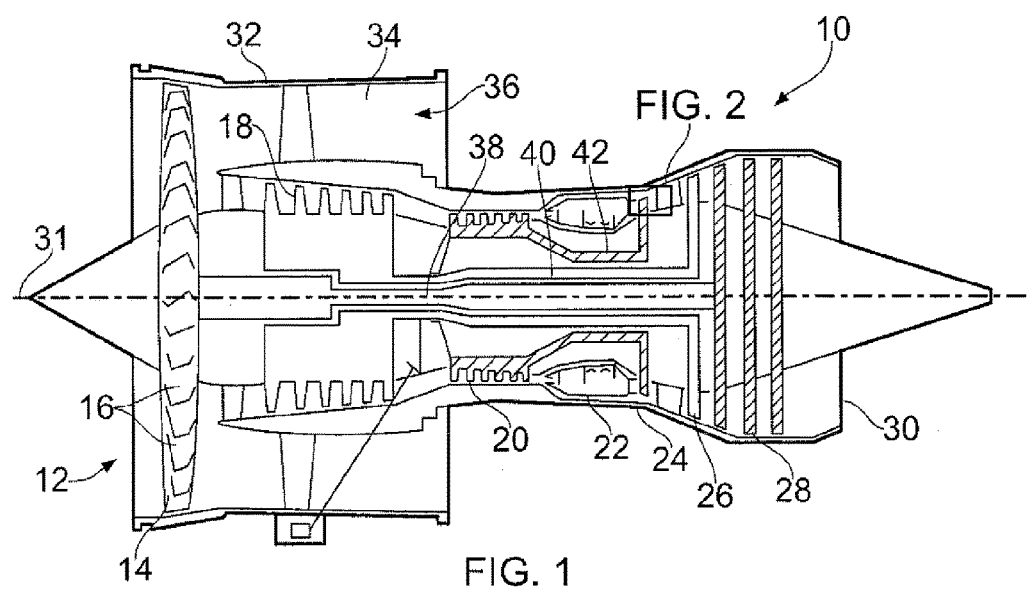
FIG. 1 shows a conventional gas turbine engine.
Figure 2:
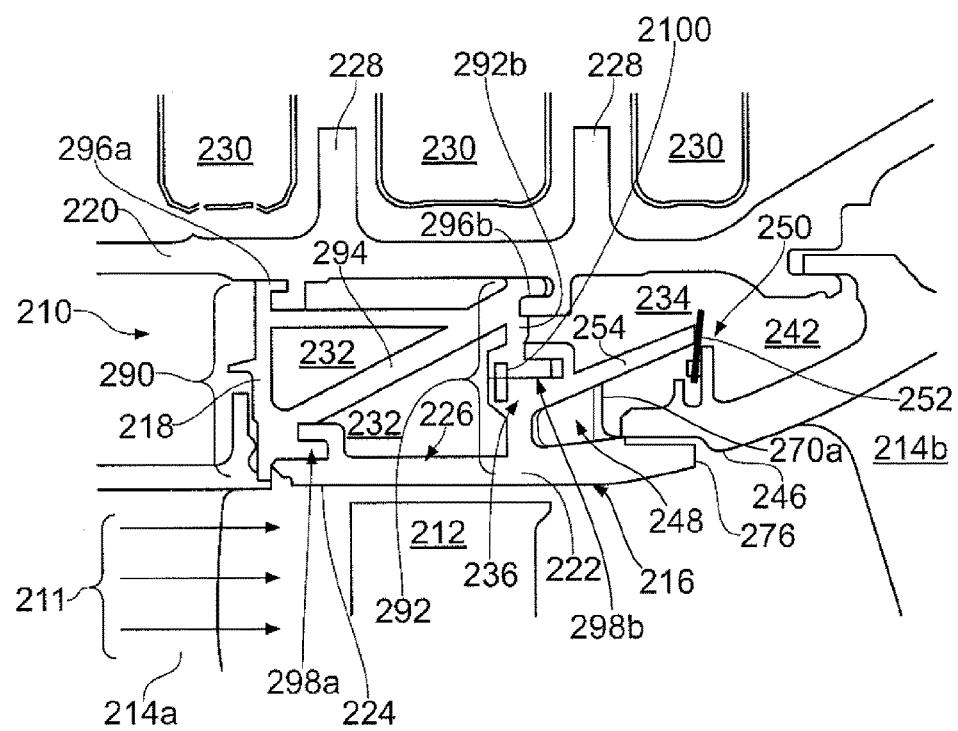
FIG. 2 shows a cross section of a turbine shroud arrangement.
Figure 3:
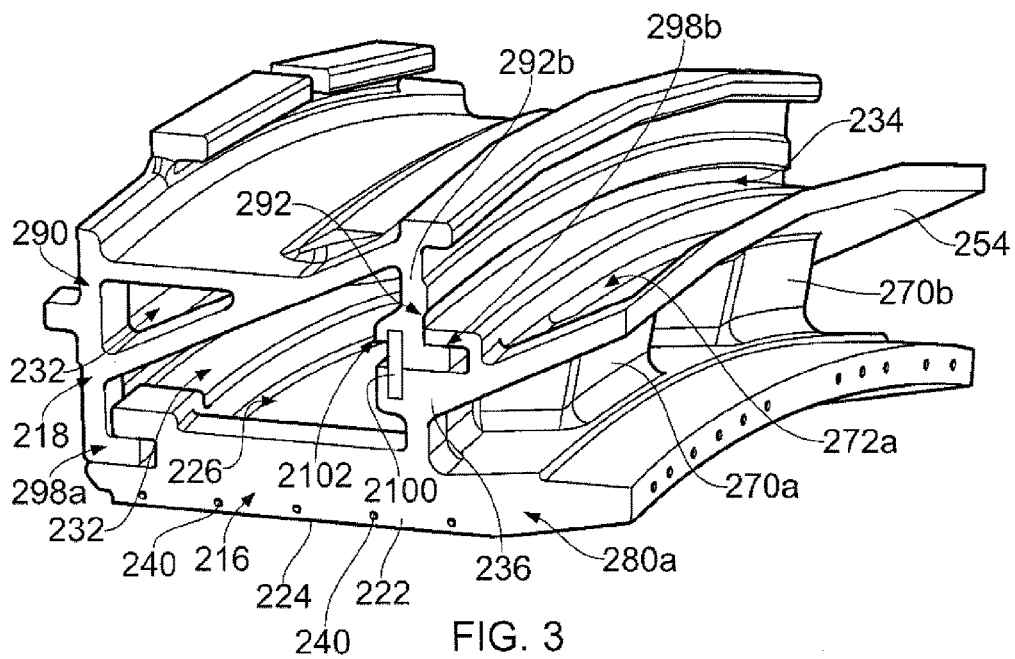
FIG. 3 shows a perspective view of a shroud cassette which forms part of the shroud arrangement shown in FIG. 2.
Figure 4:
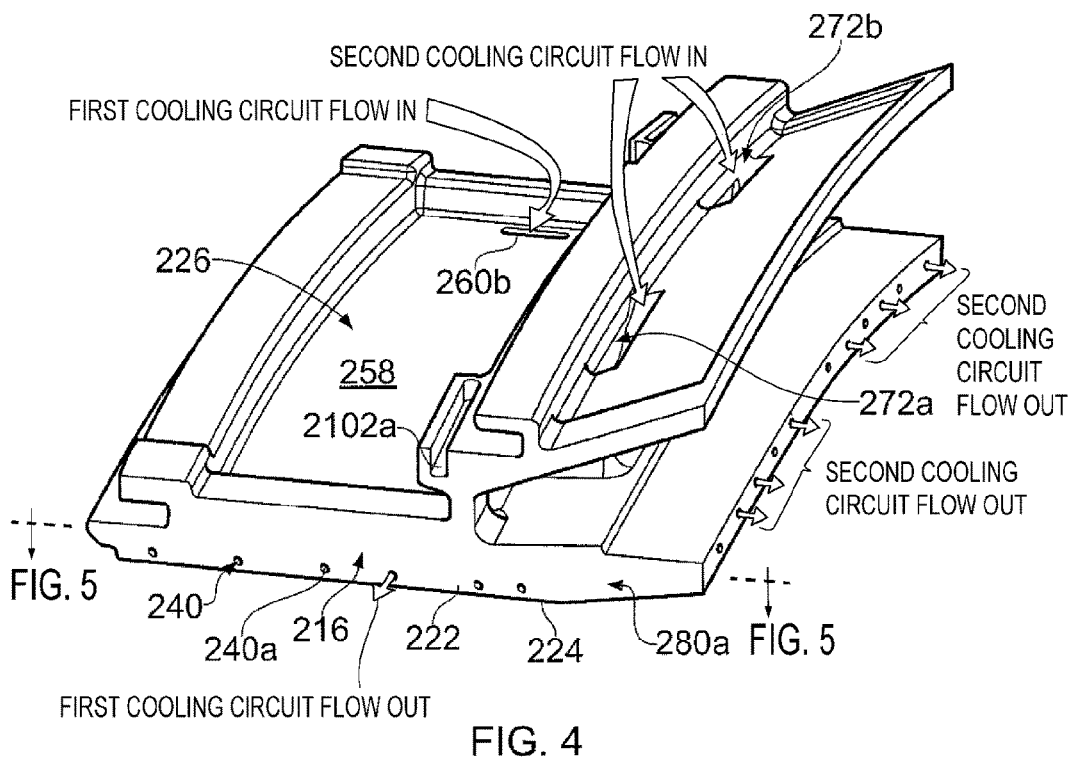
FIG. 4 shows a perspective view of a seal segment which forms part of the shroud cassette shown in FIG. 3.

FIG. 2 provides a cross-section of the shroud arrangement 210 and surrounding structure which can be located within the architecture of a substantially conventional gas turbine at a location as highlighted in FIG. 1. FIG. 3 shows a perspective schematic view of a shroud cassette which includes a seal segment 216 and carrier segment 218. FIG. 4 shows a perspective schematic representation of the seal segment 216 only.

The shroud arrangement 210 forms part of the turbine section of a gas turbine engine similar to that shown in FIG. 1 and defines the boundary of the hot gas flow path 211 thereby helping to prevent gas leakage and provide thermal shielding for the outboard structures of the turbine.

The turbine (rotor) blade 212 sits radially inwards of the shroud arrangement 210 and is one of a plurality of conventional radially extending blades which are arranged circumferentially around a supporting disc (not shown) which is rotatable about the principal axis 31 of the engine. Corresponding arrays of so-called nozzle guide vanes 214a, 214b, NGVs, are axially offset from the rotor blades 212 with respect to the principal axis 31 of the engine and alter the direction of the upstream gas flow such that it is incident on the rotor blades 212 at an optimum angle. Thus, the turbine generally consists of an axial series of NGV 214a and rotor blade 212 pairs arranged along the gas flow path 211 of the turbine, with different pairs being associated with each of the high pressure turbine, HPT, intermediate pressure turbine, IPT, and low pressure turbine, LPT.

The shroud arrangement 210 shown in FIG. 2 principally includes three main parts: a seal segment 216, a carrier 218 and an engine casing 220 which sit in radial series outside of the main gas path 211 and rotor blade 212. The shroud arrangement 210 of the embodiment is that of an HPT, but the invention may be applied to other areas of the turbine, or indeed other areas of the turbine or non-turbine applications where appropriate.

The seal segment 216 includes a plate 222 having an inboard gas path facing surface 224 and an outboard surface 226 which is provided by the radially outward surfaces of the plate 222 relative to the principal axis 31 of the engine. The seal segment 216 is one of an array of similar segments which are linked so as to provide an annular shroud which resides immediately radially outwards of the turbine rotor blades 212 and defines the radially outer wall of the main gas flow path 211. Thus, the seal segment 216 shown is one of a plurality of similar arcuate segments which circumferentially abut one another to provide a substantially continuous protective structure around the rotor blade 212 tip path.

The seal segment 216 is fixed to the engine casing 220 via a corresponding carrier segment 218. The carrier segment 218 is one of a plurality of segments which join end to end circumferentially to provide an annular structure which is coaxial with the principal axis 31 of the engine. The engine casing 220 is an annular housing which sits outboard of the carrier 218 and generally provides structural support and containment for the turbine components, including providing direct support for the shroud cassette which comprises the seal segment and carrier 218.

The seal segment 216 is contacted by the hot gas flow through the turbine and thus requires cooling air. The choice of cooling air source is largely dictated by the required reduction in temperature at a particular location and the working pressure the cooling air exhausts into. A further consideration is the fuel cost in providing the cooling air at the required pressure and temperature. That is, the provision of pressurised cooling air ultimately comes at a fuel cost and providing overly cooled or pressurised air at a particular location is potentially wasteful and may present a reduction in specific fuel consumption. In components which experience large pressure gradients, such as seal segments, this can lead to cooling air being provided at a pressure dictated by the upstream portion of the component but a temperature dictated by a downstream part of the component.

The cooling air can be provided from any suitable source but is typically provided in the form of bleed air from one or more compressor stages. Thus, air is bled from the compressor and passed through various air cooling circuits both internally and externally of the components to provide the desired level of cooling.

An additional important consideration for cooling and component life and the intervals between maintenance and servicing is the thermal management problem relating to rotor blade 212 tip clearance. That is, the separation of the seal segment 216 and the tips of the rotor blades 212 needs to be carefully monitored and reduced during use. Having as smaller a separation as possible helps reduce the amount of hot gas which can flow over the blade tips but importantly helps avoid tip rubs which degrade the protective coatings and generally increase oxidisation which reduce component life. To this end, the embodiment shown in FIG. 2 includes dummy flanges 228 on the outboard side which are arranged to receiving cooling air from annular manifolds 230 which surround the engine casing 220.

Controlling the separation is not a straight forward problem as the separating gap between the shroud and rotor blade 212 tip is affected by the thermal condition of each of the casing 220, the carrier 218, seal segment 216, the rotor 212 components and the pressures experienced by each. Thus, sophisticated cooling schemes and features are employed to help control the thermal condition of the various components under the different operating conditions.

To reduce the fuel cost associated with providing the cooling air and to improve tip clearance control, the invention utilises two sources of cooling air to cool the seal segment 216. The first has a first temperature and pressure, and the second has a second temperature and is pressure which are different to the first at the respective point of delivery to the seal segment 216. Both of the first and second cooling air flows are provided to the outboard side 226 of the seal segment 216 into two respective independent chambers 232, 234, or areas. The air is provided in this segregated manner such that it can be supplied to the seal segment plate 222 for selective cooling of different portions of the seal segment 216.

The segregation in the described embodiment is provided by a partition in the form of a bulkhead 236 which extends between the outboard surface 226 of the seal segment 216 and the engine casing 220 and divides the space therebetween into a fore portion chamber 232 and an aft portion chamber 234, each for accepting one or other of the higher and lower pressure air. In the described embodiment, the fore portion 232 is provided with a feed of higher pressure air and the aft portion 234, lower pressure air. This is commensurate with the general cooling requirements of the seal segment 216 which experiences higher pressures at the upstream leading edge 238 relative to the downstream portions due to significant pressure drop along the axial length of the inboard surface 224. The dual source cooling is also advantageous for the associated temperature profile which tends to rise from the leading edge downstream due to radial migration of the traverse. Hence, the higher pressure cooling air is required at the front of the component for cavity purge to prevent hot gas ingestion, whereas the lower pressure air with lower feed temperature at the rear of the component improves cooling where higher temperatures exist.

The differential cooling of the plate 222 is provided by supplying the first and second air sources to respective first 266 and second 268 cooling circuits which each cool different portions of the seal segment 216. That is, the first cooling circuit 266 cools a first, generally upstream, portion of the plate 222 and the second cooling circuit 268 cools a second, generally downstream, portion of the plate 222.

The first cooling circuit 266 is in fluid communication with the fore portion chamber 232 of the outboard side 226 of the plate 222 such that air provided to that portion can be ingested by the plate 222 for effecting cooling and outputted via an exhaust 240. The second cooling circuit is in fluid communication with the aft portion chamber 234 of the outboard side 226 of the plate 222 such that the second source of air can be similarly ingested and exhausted. The first 266 and second 268 cooling circuits are fluidly isolated from one another such that there is no or negligible air flow between the two, thus helping to maintain the desired pressure and temperature differential.

The fore portion chamber 232 is fluidly connected to one of the higher pressure stages of the compressor such that bleed air can be provided for cooling of the seal segment 216 as is commonly known in the art. The aft portion chamber 234 is in fluid communication with an air chamber 242 which is located above the nozzle guide vane 214b of the next turbine stage, which in the described embodiment is the IP NGV but could for example be a second HP NGV. Thus, the seal segment 216 is located upstream of another component which includes an internal cavity which requires cooling air in normal use. As will be appreciated, the NGV 214b requires cooler air at a lower pressure than the upstream turbine rotor stage so as to better match the state of the hot gas flow local to the NGV 214b. Hence, the air chamber 242 is in fluid communication with a lower pressure stage of the compressor so as to receive lower pressure air at a lower temperature. Such air can be provided at a reduced fuel cost and is thus beneficial.

The IP NGV 214b includes a platform 246 which is placed radially outwards of the gas flow path so as to have a gas washed surface. The aerofoil portion of guide vane 214b extends from the platform 246 generally toward the principal axis 31 of the engine. The seal segment 216 and NGV platform 246 are radially separated by an annular gap such that relative movement is possible between the two components. This is necessary to accommodate the different temperatures and pressures experienced in the corresponding portions of the gas flow path. In particular, there is a general requirement to control the radial position of the seal segment 216 to help reduce tip clearance to a preferred minimum and this is more easily achieved if the seal segment 216 is physically separated from adjacent components along the gas flow path.

To allow cooler air to be provided from a downstream direction, a first part 254 of a two part seal 250 is attached on the outboard side of the seal segment 216. The second part 252 of the two part seal 250 is attached to the second component (the NGV 214b in this case) such that, in the assembled gas turbine engine, the two part seal 250 provides an isolation chamber 248 which is in fluid communication with and pressurised by the hot gas flow path 211 via the trailing edge 276 of the plate 222. The isolation chamber 248 isolates the main gas flow path from a space on the outboard side 226 of the seal segment thereby allowing the formation of a fluid pathway between the physically separated axially adjacent components of the seal segment 216 and NGV 214b.

That is, the creation of the isolation chamber 248 allows delivery of cooling air to the aft portion 234 from a downstream direction and for this to be segregated at the required respective temperature and pressure, whilst allowing for independent movement of the seal segment 216.

In order to prevent leakage of gas from the main gas stream chamber 248 into the aft portion 234 which contains the cooling air, the two part seal 250 is provided in the form of a flap seal. The flap seal incorporates a relatively flexible annular member 252 which is secured to the platform 246 of the NGV 214b. The flexible seal 252 is biased against and abuts a sealing flange 254 which extends from the partitioning bulkhead 236 of the seal segment 216.

The sealing flange 254 is a continuous annular member which extends in a downstream direction from a supporting structure in the form of the bulkhead 236. The sealing flange 254 also has a radial component so as to be inclined away from the rotational axis 31 of the engine in the downstream direction. The free end of the sealing flange 254 and the trailing edge 276 of the plate 222 are axially coterminous in a plane which is normal to the rotational axis of the engine. However, other configurations are possible.

Hence, the area downstream of the partition 236 which is radially outwards of the plate 222 comprises two chambers 234, 248. The first is the aft portion chamber 234 which receives an air supply which is common to the NGV 242 for the second cooling circuit 268. The second is the main gas flow isolation chamber 248 that is pressurised by the main gas flow path 211 and which is bounded by the bulkhead 236, the sealing flange 254 that extends from the bulkhead 236, the flap 252 of the flap seal 250 and the NGV platform 246. The trailing edge 276 of the plate and an upstream portion of the NGV platform 246 provide the inlet to the isolation chamber 248.

Figure 5:
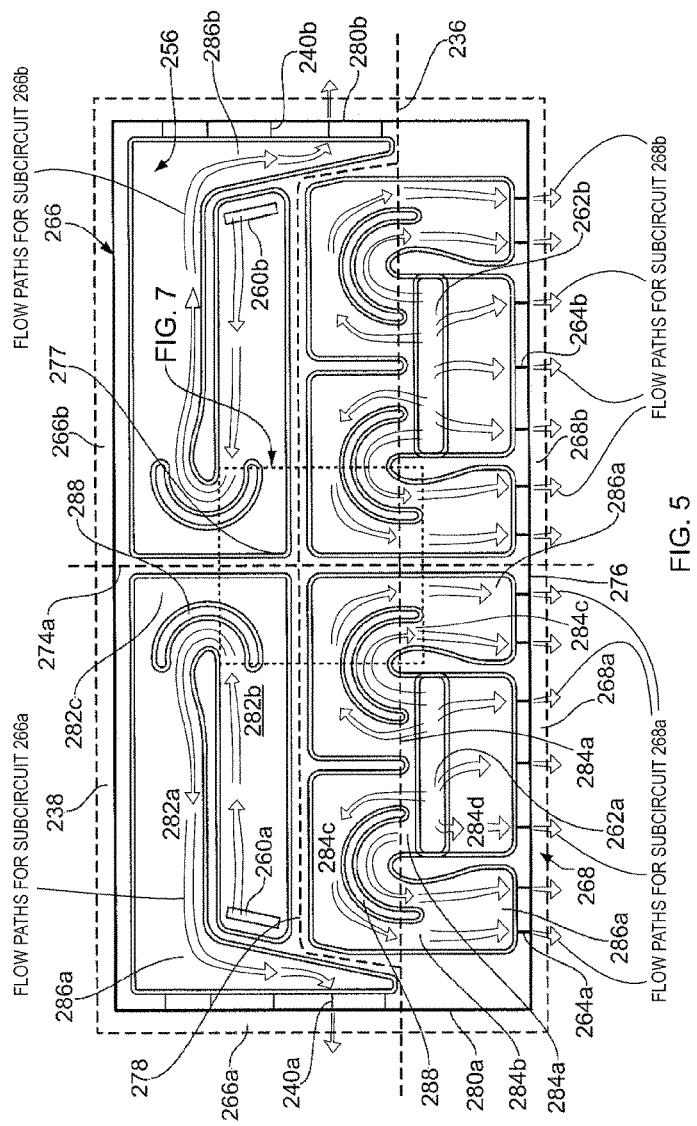
FIG. 5 shows a plan schematic of the internal cooling architecture of the seal segment shown in FIG. 3.

The internal arrangements of the first 266 and second cooling 268 circuits are best viewed in FIG. 5 which shows a schematic plan view of the interior of the seal segment plate 222. The sealing segment plate 222 is constructed from two radially separated walls 256, 258 which provide the radially inner 224 and outer 226 surfaces of the seal segment 216. In between the two walls 256, 258 are located the first 266 and second 268 cooling circuits. In the described embodiment, each cooling circuit has two sub-circuits 266a,b 268a,b, each with an inlet 260a,b, 262a,b and one or more outlets 240a,b, 264a,b which exhaust the cooling air back into the main gas flow path 211 such that the exiting air can provide a cooling jet or film, as required.

The inlets 260a,b to the first cooling circuit 266 are provided by apertures placed in the radially outer wall 258 of the plate 222 which enters a cavity therebelow. The inlets 262a,b of the second cooling circuit 268 are provided by a plurality of chimneys 270a,b, two in the present embodiment, which extend down the aft side of the aft bulkhead 236 from above the sealing flange 254. Each chimney 270*a,b* includes a boundary wall which defines a passageway 272*a,b* between the aft portion chamber 234 located radially outwards of the sealing flange 254 and the second cooling circuit 268 within the radially separated walls of the plate 222. The passageway 272*a,b* provided by each chimney 270*a,b* allows the lower pressure chamber to be fluidly connected to the cooling circuit across the main gas path isolation chamber 248.

Figure 6:
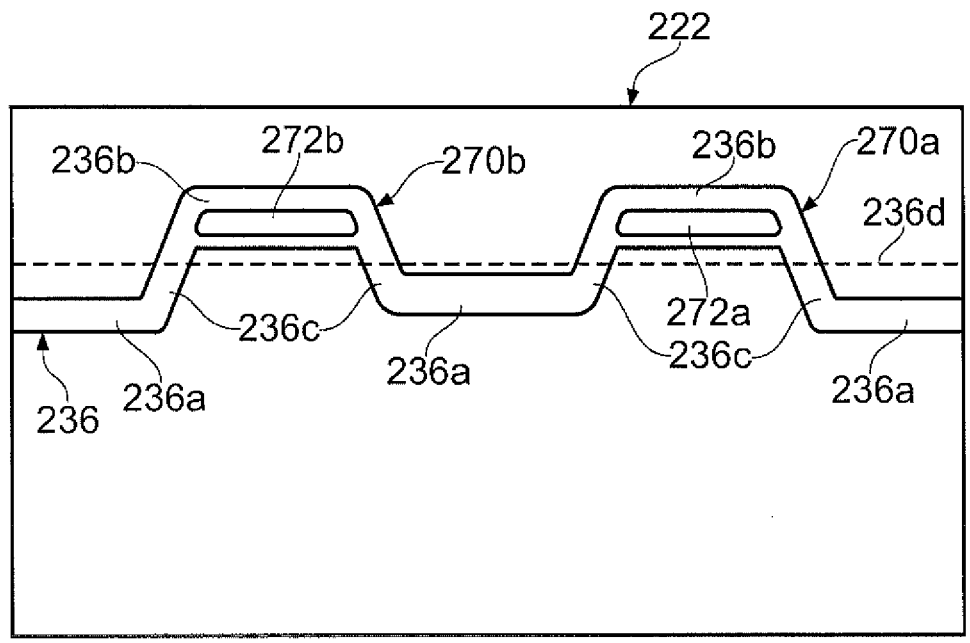
FIG. 6 shows a plan section schematic of the bulkhead portion and chimney inlets of the seal segment shown in FIG. 3.

The chimneys 270*a,b* can be any suitable structure but, as can be best seen in FIGS. 3, 4 and 6, are integrally formed with bulkhead 236 so as to form a single piece structure such that one of the walls of each chimney 270*a,b* is provided by the bulkhead 236. Ideally, the chimneys 270*a,b* are located aft of the bulkhead 236 such that they do not perforate bulkhead and alter the structural integrity of the component which could disrupt the reaction line between the seal segment 216 and engine casing 220. Hence, the portion of the bulkhead 236 which is provided by the seal segment 216 is constructed from sections of axially offset portions of circumferentially extending wall as best viewed in the plan section of FIG. 6. There are fore wall 236*a* and aft wall 236*b* portions which are connected by axially extending wall portions 236*c* so as to provide a meandering or concertinaed wall when viewed in plan. The wall portions 236*a-c* are integrally formed so as to provide a continuous structure and allow for the effective partitioning of the gas chambers on the outboard side of the plate 222.

The aft supporting member 292*b* of the carrier 218 extends radially outwards from the mid-line of the meandering wall along a plane toward the engine casing 220. The plane 236*d* lies normal to the rotational axis 31 of the engine and is located between the axially offset portions of wall 236*a-c*. Thus, the line of reaction from the plate 222 to the engine casing 220 is evenly distributed through offset walls 236*a-c* of the seal segment 216 bulkhead.

The aft wall portions 236*b* of the concertinaed bulkhead wall are provided in part by the chimneys 270*a,b* such that at least one wall of the chimneys 270*a,b* contribute to the load carrying and sealing function of the bulkhead 236 whilst providing a passageway 272*a,b* from the aft portion chamber 234 above the sealing flange 254 to the second cooling circuit 268 within the plate 222.

Providing the chimneys 270*a,b* as an integral structure with the plate 222 and associated portion of the bulkhead 236 can be particularly advantageous as it allows the seal segment 216 to be cast as a unitary structure which is made as a homogenous body of a common material. This can simplify the construction of the seal segment 216 and can allow for superior thermal control during operation due to the commonality and continuity of the material used to construct the component. However, it will be appreciated that in some applications it may be beneficial to construct the component from multiple parts which are assembled after being individually fabricated.

Returning to FIG. 5, the space within the plate 222 is approximately divided into four quadrants which provide the two sub-circuits 266*a,b* for the first cooling circuit 266, which are located in the fore portion of the plate 222, and the two sub-circuits 268*a,b* for the second cooling circuit 268, which are located in the aft portion of the plate 222. The two sub-circuits 266*a,b*, 268*a,b* of the first 266 and second 268 cooling circuits are generally symmetrical about a mid-plane 274*a* which passes from the leading edge 238 to the trailing edge 276 of the seal segment 216.

The fore and aft divide which defines the first 266 and second 268 cooling circuits within the plate 222 is provided by a partitioning wall 278 which extends across the plate 222 between the circumferential edges 280*a,b* at an approximate mid-point between the leading 238 and trailing 276 edge thereof. In the described embodiment, the wall 278 does not extend all the way between the circumferential edges 280*a,b* due to the convergent exhaust portions 286*a,b* of the first cooling circuit 266 which extend along the circumferential edges 280*a,b* of the plate 222 from the leading edge 238 towards the trailing edge 276, thereby encroaching into the aft portion of the plate 222.

The first (and second) sub-circuit 266*a* of the first cooling circuit 266 is provided by a meandering passage in the form of a U shape having two straight portions 282*a,b* connected by a sharp bend 282*c* which reverses the trajectory of the coolant. The straight portions 282*a,b* are substantially parallel to one another and generally traverse the plate 222 circumferentially (or laterally) so as to extend between the circumferential edge 280*a* towards the mid-line plane 274*a* of the plate where the bent portion 282*c* is located. One of the straight portions 282*a* is an outlet leg and is located aft of and defined by a wall which provides the leading edge 238 of the plate 222. The other straight portion 282*b* provides the inlet leg of the first cooling circuit sub-circuit and runs parallel to and aft of the outlet leg 282*a*. The two straight legs are separated by a single solid wall therebetween.

A convergent exhaust 240 is located at a downstream end of the outlet leg 282*a* and extends along the circumferential edge 280*a* of the plate 222 from the leading edge 238 towards the trailing edge 276. The exhaust 238 terminates around two thirds along the length of the circumferential edge 280*a* radially inwards of the partitioning bulkhead 236 the position of which is indicated by the dashed line in FIG. 5. The inlets 260*a,b* to the first cooling circuit 266 sub-circuits are provided by apertures placed in the radially outer wall of the plate 222. The inlets 260*a,b* are placed at the upstream end of the each of the sub-circuits 266*a,b* adjacent the circumferential wall which defines the convergent exhaust 286*a*.

The sub-circuits 268*a,b* of the second cooling circuit 268 are symmetrically arranged about the previously described axially extending mid-plane 274*a* in the aft portion of the plate 222 and include meandering passages. However, the meandering passages of the second cooling sub-circuits 268*a,b* are 'm'-shaped with the u-bends of the m-shapes being presented towards the fore and aft partitioning wall 278 which defines the first and second cooling circuits 266, 268.

The inlets 262*a,b* to the second circuit cooling sub-circuits 268*a,b* are located along the mid-branch of the 'm' shape so as to provide an inlet flow which is split three ways between two upstream flows 284*a* which proceed into the U-bend portions 284*c* of the m shape, and a downstream flow 284*d* which passes directly to an exit at the trailing edge 276. The inlets 262*a,b* are provided by the chimneys 270*a,b* and therefore aft of the partitioning bulkhead 236 as described above. From the inlets 262*a,b*, the upstream passages extend toward the leading edge 238 of the plate 222 via a short straight passageway 284*a* before doubling back towards the trailing edge 276 via respective u-bend portions 284*c* at the partitioning wall 278 and straight outlet portions 284*b*. The final portion of the outlet passages 284*b* are flared slightly to provide a divergent exhaust portion 286*a* along the trailing edge 276.

Each of the passages of the first and second circuits 266, 268 includes bifurcating wall 288 around each u-bend portion which is arranged to split the flow around the tight bend and help reduce separation of the flow and provide uniform cooling. It will be appreciated that other formations may be provided in the some embodiments in order to increase the cooling efficiency of the flows.

Figure 7:
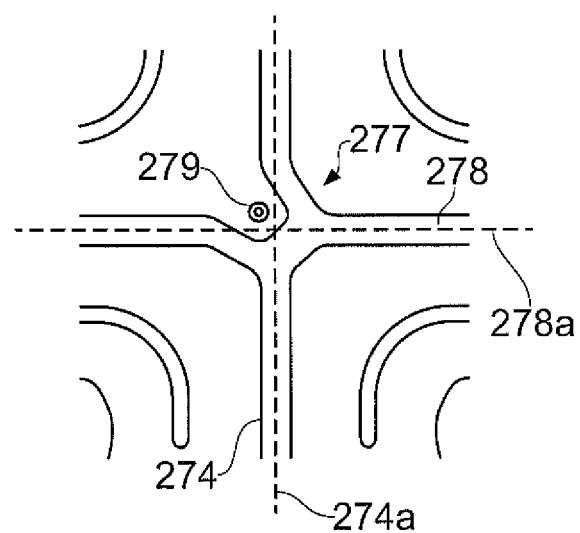
FIG. 7 shows an alternative arrangement for the internal cooling architecture of the seal segment shown in FIG. 5.

FIG. 7 shows a modification of the cooling architecture presented in FIG. 5. In the embodiment of shown in FIG. 5, the walls 274, 278 which define the first and second cooling circuit 266, 268 sub-circuits meet at an intersection 277 which is central to the four cooling sub-circuits. However, due to the arrangement of the cooling circuits 266, 268 and the respective fluid flows therein, there is a reduced level of cooling at the intersection 277 which can create an increase in the local heating. This is generally undesirable as it can lead to degradation of a thermal barrier coating which is applied to the inboard surface of the plate 222.

To help alleviate this; the intersection 277 of the walls 274, 278 which partition the sub-circuits of first and second cooling circuits 266, 268 is offset in the embodiment shown in FIG. 7. This allows a cooling flow to be introduced proximate to the centre of the four sub-circuits via a secondary inlet 279 thereby helping to alleviate the formation of deleterious hot spots and generally provide more uniform cooling.

More specifically, the walls 274, 278 are predominantly straight and define longitudinal axes 274, 278 which intersect at a first location. However, each of the walls 274, 278 include a chicane or notch portion local to the central point of the cooling circuits which results in the intersection 277 of the walls being offset relative to the longitudinal axes and at a second location. Hence, one of the cooling circuits includes an alcove which has surrounding walls which provide the intersection of the partitioning walls 274, 278.

The secondary inlet 279 opens on the outboard side 226 of the plate 222 into the fore portion chamber so as to provide an additional local impingement of the higher temperature, higher pressure cooling air to the central portion of the plate 222. The approximate location of the secondary inlet 279 will be application specific and dependent on the level of additional cooling required and the available cooling air source. The inlet can be provided at or local to the intersection of the longitudinal axes 274a, 278a.

The seal segment 216 and carrier 218 are attached together to provide the seal segment cassette shown in FIG. 3 which is supported by the engine casing 220. The seal segment 216, carrier 218 and engine casing 220 each include formations in the form of fore and aft attachments which correspond to and engage one another to provide fore 290 and aft 292 supporting members. The aft, or downstream, supporting member 292 forms the bulkhead 236 which partitions the space above the seal segment 216 into the higher pressure area and a lower pressure area. The fore supporting member 290 includes one or more apertures so as to be permeable to a cooling air flow from the upstream side to the downstream thereof. It will be appreciated that in other embodiments, the fore supporting member 290 may provide the partition on the outboard side of the plate 222. Alternatively, both supporting members 290, 292 may provide fluid partitions such that there can be multiple air source chambers at different temperature and pressures.

Each carrier segment 218 is principally constructed from a plurality of interconnected members and struts. More specifically, there are fore and aft supporting members which extend radially towards the engine casing 220 from the seal segment 216, and a strut 294 which diagonally braces between the two supporting members 290, 292 so as to react some of the forces experienced by the carrier 218 towards the engine casing 220 when in use.

The fore and aft attachments 296a,b which attach the casing 220 to the carrier 218, and the fore and aft attachments 298a,b which attach the carrier 218 to the seal segment 216, are of a similar type and take the form of two part interengaging sliding couplings. The couplings as best seen in the cross-section of FIG. 2 can be referred to as bird mouth couplings in the art and include clasp-like formations having mutually defining slots and flanges on each of the components, the slot of one component mating with the flange of the other and vice-versa. It will be appreciated that attachment mechanisms other than the bird mouth type may be applicable in some cases.

When assembled, the seal segment 216 is adaptably attached to the carrier 218 by the fore attachment 298a and the aft attachment 298b which allow relative axial movement between the seal segment 216 and carrier 218, but which limit relative movement in the radial direction. Similarly, the carrier 218 is attached to the engine casing 220 via corresponding fore 296a and aft 296b attachments.

The fore 296a, 298a and aft 296b, 298b attachments of adjacent components in the described embodiment are axially spaced by a similar dimension such that the fore and aft attachments mate simultaneously during assembly. Further, the attachments are such that they can be slidably engaged from a common direction, in this case an axial downstream direction with respect to the principal axis 31 of the engine. The mating direction of the carrier 218 and engine casing 220 is also axial but opposite to the mating direction of the carrier 218 and seal segment 216. Hence, the casing 220, which is taken to be stationary, receives the carrier 218 from an upstream direction, and the carrier 218 receives the seal segment 216 from the downstream direction.

More specifically, one of the seal segment 216, carrier 218 and engine casing 220 includes one part of a coupling in the form of a slot which snugly receives a corresponding projection in the form of a flange of the adjacent component. Generally, the slots have axial length and extend circumferentially around the engine to provide a ring channel which is rectangular in the cross-section in a plane which includes the principal axis 31 of the engine. Each slot has an open end and a closed end, with the open end receiving the corresponding flange of the adjacent component.

The open end of the attachment slots on the carrier 218 are provided at the downstream end such that the corresponding hook formations on the seal segment 216 plate can only enter from the axially downstream end. Vice-versa, the open end of the seal segment 216 slots are provided at the upstream end of the slot. Likewise, the arrangements of the casing 220 attachment slots are located on the upstream end of the slots such that the corresponding flanges of the carrier 218 can only enter from the upstream direction.

When in use, the seal segment 216 experiences a large axial pressure drop across the bulkhead which tends to force the structure in a downstream direction and it is necessary to restrain this movement. This is problematic because conventional axial restriction means are difficult to incorporate with a dual air source architecture.

In the described embodiment, the dual air feed requires two distinct chambers 232, 234 radially outwards seal segment 216. This requires a fluid pathway to be provided whilst isolating the main gas flow path. Conventional means for attaching a seal segment 216 to a carrier 218 may include so-called 'C' clamps in which a resilient biasing clasp is resistance fitted around the corresponding and coterminous free ends of two mated flanges, thereby preventing separation in a direction normal to the mating surfaces and also restricting axial movement. The provision of the mating flanges ideally needs to be on the downstream side of the aft supporting member to allow the attachment of the C clamp. However, this is not straight forward when it is necessary to isolate the main gas path flow. In particular, it is not considered feasible to provide a two part seal 250 to define the isolation chamber 248 and use a conventional axial restraint without unnecessarily increasing the overall size of the component. That is, providing the C clamp on the upstream side of the aft supporting member is not possible without relocating the carrier strut 294 or significantly increasing the axial or radial dimensions of the shroud arrangement, or providing an alternative architecture for the dual source air supply.

To overcome the problem of axial retention, there is provided a seal segment 216 and carrier segment 218 for a gas turbine engine, comprising first and second axially engaging retention features in the form of the fore and aft bird mouth couplings described above. The axially engaging retention features slidably engage from a common, downstream, direction and prevent radial movement when engaged.

To prevent axial movement of the seal segment, the shroud arrangement 210 includes an axial restrictor in the form of a shear key 2100. In the present embodiment, the seal segment 216 is mounted to the engine casing 220 via the carrier 218 and so the axial restrictor prevents relative axial movement between the seal segment 216 and engine casing via the carrier 218. The axial retention of the carrier and engine casing 220 is achieved with bolts.

The shear key 2100 is snugly received in a slot 2102 which is provided in the circumferential edge 280a of the shroud cassette. The slot 2102 is partially defined within the seal segment 216 and carrier 218 so as to be presented across the parting line between the two components. Thus, there is a partial slot 2102a machined into the circumferential edge of the seal segment with a corresponding opposing partial slot in the carrier. The two partial slots combine upon assembly of the shroud cassette to provide a single slot 2102.

Slots 2100 are provided in both circumferential edges 280a, 280b of the seal segment 216 such that they are at a common radial distance and axial position relative to the principal axis 31 of the engine and oppose one another when similar shroud cassettes are assembled into the annular shroud arrangement within the engine casing 220. In this way, the seal segments and carriers can be assembled to provide the shroud cassettes before the shear keys 2100 are inserted within the slots 2102. Once the cassettes are positioned next to each other within the engine casing 220, the shear keys 2100 of adjacent cassettes are juxtaposed to prevent withdrawal.

It will be appreciated that in some embodiments, the radial and axial position of the axial restrictors provided on the circumferential edges 280a, 280b of a shroud cassette may be offset relative to one another such that the axial restrictors may be retained but partially exposed in the assembled shroud arrangement 210. This may be useful for inspection purposes.

Figure 8:
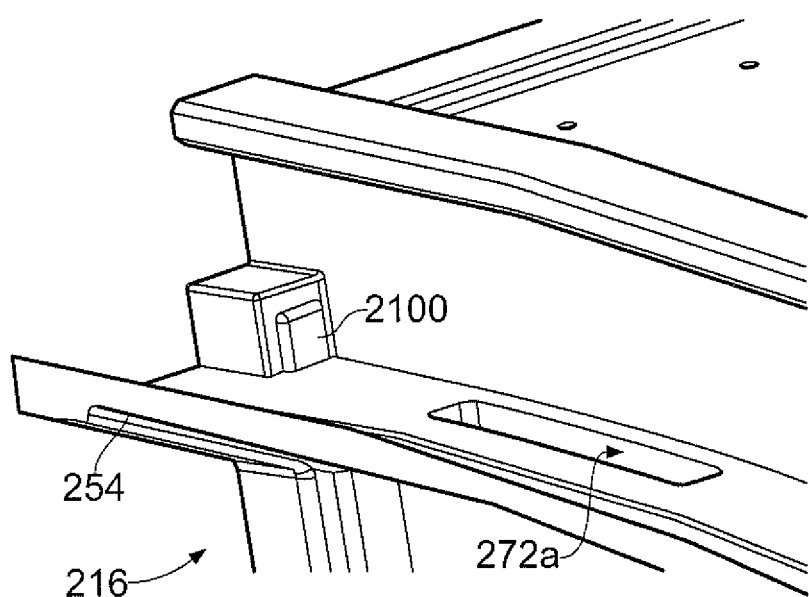
FIG. 8 shows an axial restrictor which can be implemented in the shroud cassette shown in FIG. 3.

As shown in FIG. 8, the shear key 2100 can be provided on the downstream end of the seal segment and aft of the bulkhead which partitions the higher and lower pressure zones. Thus, there is provided a slot to the rear of and partially defined within the bulkhead 236 above the sealing flange 254. However, it could be placed below the sealing flange 254 which appends from the bulkhead 236 as described above, or on the upstream side of the bulkhead as shown in FIG. 3.

To assemble the shroud arrangement 210, the seal segments 216 are attached to the corresponding carrier segment 218 to provide a cassette which is then fitted to the engine casing 220. To attach the seal segment 216 to the carrier 218, the two components are aligned with one another in an axially offset manner such that the corresponding bird mouth attachments can engage upon relative axial movement. Once the bird mouths are sufficiently engaged, the shear key slots are aligned to provide the slot 2102 for receiving the shear keys 2100 which are inserted from the respective circumferential edge of the cassette 280a,b.

Once the cassette has been formed, it is presented to the engine casing 220, upstream of the casing bird mouth attachments before being axially slid downstream into place. A plurality of cassettes are constructed and mounted within the casing to provide the annular shroud arrangement. When all in place, the cassettes are bolted to the engine casing to prevent axial movement during use.

During operation of the engine, a first flow of higher pressure air is bled from one of the latter compressor stages and fed into the fore portion chamber 232 via a suitable conduit. From there the air passes into the first cooling circuit 266 within the plate 222 via the first inlet 260a,b before being expelled into the main gas flow path of the turbine via the circumferential exhausts 240.

A second flow of lower pressure air is directed from an upstream portion of the compressor (relative to the higher pressure air) and fed into the space 242 above the IP NGV and thus over the two part seal 250 and into the second cooling circuit 268 of the plate 222 via the chimneys 270a,b before being expelled into the gas flow path downstream of the plate 222.

It will be appreciated that the respective cooling flows can be controlled and possibly modulated so as to manage the cooling of the seal segment 216 for a desired purpose. This purpose may be for preserving the life of the component, but may form part of a turbine tip clearance scheme in which cooling of the carrier 218, seal segment 216 and engine casing 220 are controlled to govern the separation of the rotor blade tip and the gas washed surface of the seal segment.

The above described embodiments are examples of the invention defined by the claims. Alternatives within the scope of the claims are contemplated. For example, in some embodiments, the seal segment may be attached directly to the engine casing with no carrier. In other embodiments, the cooling air may not be exhausted into the main gas path. In addition, as will be appreciated, the gas turbine engines which utilise the invention may be any gas turbine engine of any application. For example, the gas turbine may be for an aero engine or an industrial engine. In some embodiments, the described arrangements may be used with a single source of cooling air. For example, the cooling air may be provided to the plate from a downstream end only.

It will be appreciated that the various features of the shroud arrangement and gas turbine engine described above may be used in conjunction with one another or in independently where possible. For example, the shear key may be used with or without a dual source cooling scheme. Further, the dual source cooling scheme may or may not employ chimney inlets. And the meandering internal architecture of the cooling schemes within the plate may be utilised with or without the partitioning bulkhead for example.

The invention claimed is:

1. A seal segment of a shroud arrangement for bounding a main hot gas flow path within a gas turbine engine, comprising:

a plate having an inboard main hot gas flow path facing side and an outboard side;

a bulkhead extending from the outboard side of the plate which defines a fore portion and an aft portion;

a first cooling circuit within the plate for cooling a first portion of the plate;

a second cooling circuit within the plate for cooling a second portion of the plate; and, one or more chimneys which define one or more inlet passages each of which extends from an inlet at the fore portion or the aft portion to one of the first or second cooling circuits, wherein the first cooling circuit is in fluid communication with the fore portion and the second cooling circuit is in fluid communication with the aft portion and the first and second cooling circuits are fluidically isolated from one another wherein:

the one or more chimneys extend from the inlet and across an isolation chamber to the first or second cooling circuit, the isolation chamber being in fluid communication with and pressurized by the main hot gas flow path.

2. A seal segment as claimed in claim 1, further comprising a fore attachment and an aft attachment for supportably attaching the seal segment to a carrier or engine casing, wherein the bulkhead is part of either the fore or aft attachment.

3. A seal segment as claimed in claim 1, wherein the chimneys form part of the bulkhead.

4. A seal segment as claimed in claim 1, wherein the seal segment is one of an annular set which are coaxial with the principal axis of the gas turbine engine when in use, and the bulkhead includes axially offset portions of a circumferentially extending wall, in which the axial offset is with respect to the principal axis.

5. A seal segment as claimed in claim 4, wherein at least one of the axially offset portions of circumferentially extending walls is provided by at least one of the one or more chimneys.

6. A seal segment as claimed in claim 1, wherein each cooling circuit includes two or more sub-circuits.

7. A seal segment as claimed in claim 1, wherein the second cooling circuit terminates in one or more outlets local tolocated at a downstream edge of the plate.

8. A seal segment as claimed in claim 1, wherein the seal segment is configured to provide one circumferentially extending segment of a segmented annular shroud, and the first cooling circuit terminates in one or more outlets local to a circumferential edge of the shroud.

9. A seal segment as claimed in claim 1, further comprising one part of a two part seal, the two part seal separating the aft portion from the main hot gas flow path when in an assembled gas turbine engine.

10. A seal segment as claimed in claim 9, wherein the one part of the two part seal is a flap seal.

11. A gas turbine engine including a shroud arrangement, comprising:

an engine casing; and a seal segment according to claim 1.

12. A gas turbine engine as claimed in claim 11, wherein the fore portion is in fluid communication with a first air source having a first pressure and temperature, and the aft portion is attached to a second air source having a second pressure and temperature.

13. A gas turbine engine as claimed in claim 11, wherein the aft portion is connected to a chamber which provides air to a downstream nozzle guide vane.

14. A gas turbine engine as claimed in claim 1, wherein the second cooling circuit terminates in one or more outlets located downstream of the first cooling circuit.

* * * * *